United States Patent
Bansod et al.

(10) Patent No.: US 9,282,038 B2
(45) Date of Patent: Mar. 8, 2016

(54) POLICY CONTROL ENFORCEMENT AT A PACKET GATEWAY

(75) Inventors: Neelesh Bansod, Sunnyvale, CA (US); Brian Kean, Cincinnati, OH (US)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1029 days.

(21) Appl. No.: 13/421,436

(22) Filed: Mar. 15, 2012

(65) Prior Publication Data

US 2013/0242997 A1    Sep. 19, 2013

(51) Int. Cl.
| H04L 1/00 | (2006.01) |
| H04L 12/28 | (2006.01) |
| H04J 3/22 | (2006.01) |
| H04L 12/741 | (2013.01) |
| H04L 12/911 | (2013.01) |
| H04L 29/06 | (2006.01) |
| H04L 12/66 | (2006.01) |

(52) U.S. Cl.
CPC .............. *H04L 45/745* (2013.01); *H04L 47/70* (2013.01); *H04L 69/166* (2013.01); *H04L 69/22* (2013.01); *H04L 12/66* (2013.01)

(58) Field of Classification Search
CPC ....... H04L 69/22; H04L 69/166; H04L 47/70; H04L 12/66; H04L 45/745
USPC ........... 370/252, 389, 392, 395.31, 401, 471, 370/474, 230, 395.2, 395.52, 465; 455/418
See application file for complete search history.

(56) References Cited

U.S. PATENT DOCUMENTS

| 8,644,339 | B1* | 2/2014 | Krishna et al. ............... 370/471 |
| 2004/0184455 | A1* | 9/2004 | Lin ............................. 370/392 |
| 2005/0286517 | A1 | 12/2005 | Babbar et al. |
| 2010/0027436 | A1* | 2/2010 | Yamasaki ..................... 370/252 |
| 2010/0150148 | A1* | 6/2010 | Kumar ......................... 370/389 |
| 2010/0226373 | A1* | 9/2010 | Rowell et al. ............ 370/395.31 |
| 2011/0261822 | A1 | 10/2011 | Battestilli et al. |
| 2012/0108225 | A1* | 5/2012 | Luna et al. ................... 455/418 |
| 2013/0003727 | A1* | 1/2013 | Ramaraj et al. ............... 370/389 |

FOREIGN PATENT DOCUMENTS

| EP | 2061190 A1 | 5/2009 |
| EP | 2226976 A1 | 9/2010 |

OTHER PUBLICATIONS

3GPP TS 23.203 V11.3.0 (Sep. 2011), 3rd Generation Partnership Project; Technical Specification Group Services and System Aspects; Policy and charging control architecture (Release 11), Nov. 2011, the whole document.

* cited by examiner

*Primary Examiner* — Alpus H Hsu
*Assistant Examiner* — Camquyen Thai (57) ABSTRACT

A packet gateway (PGW) receives a plurality of IP packet fragments from a network. The IP packet fragments comprise a head fragment and one or more trailing fragments, and are associated with a first IP packet. As the fragments are received, a controller at the PGW classifies the fragments. The controller applies a same selected service treatment to the head fragment and to each of the trailing fragments based on the classification of the head fragment. The PGW then sends each treated packet fragment to an end user device.

16 Claims, 7 Drawing Sheets

POLICY CONTROL ENFORCEMENT AT A PACKET GATEWAY

FIELD OF THE INVENTION

The present invention relates generally to the processing of data packets in communications networks, and more particularly to the processing of fragmented data packets by a Policy Control Enforcement Function (PCEF) executing on a Packet Gateway (PGW) in the network.

BACKGROUND

The Packet Gateway (PGW) is a network entity that anchors subscriber devices to a wireless communications network. Generally, the PGW receives IP packets from a core network, and then sends those packets to the subscriber device via an Access Network (AN). However, before communicating the IP packets to the subscriber device, the PGW first processes the received IP packets in accordance with a well-known set of standards (i.e., 3GPP TS 23.203 V11.4.0 (2011-12) entitled "3rd Generation Partnership Project, Technical Specification Group Services and System Aspects, Policy and Charging Control Architecture").

As defined in TS23.203, the PGW has a set of Policy and Charging Control (PCC) rules. These rules define a Policy Control and Enforcement Function (PCEF) performed at the PGW. Particularly, the PCC rules contain packet filters that classify IP packets to service data flows (SDF) and a set of services to be applied for each SDF of the packet. The packet filters classify incoming an IP packet based on the information carried by the packet's L3 header (e.g., the IP source address, the destination address, and the protocol type), as well as the information contained in the packet's L4 header (e.g., the source and destination port depending on the protocol type). Thus, for a given IP packet destined for delivery to a subscriber device, the PGW first applies the packet filters to identify the appropriate SDF for the IP packet, and then applies the SDF services to the IP packet. Some of the services that may be applied to the SDF include, but are not limited to, charging, bearer-binding, and policing.

In some cases, the IP packets are very large (e.g., video packets). Therefore, the core network may send large IP packets in fragments to the subscriber. That is, a single large IP packet may be divided into a plurality of smaller constituent IP packets referred to as "fragments." The first fragment is commonly referred to as the "head" fragment while the remaining fragments are commonly referred to as "trailing" fragments. The processes of fragmenting facilitates the communication of large IP packets over the network; however, it also means that the subscriber device must first reassemble large IP packets from their constituent fragments before it can consume the IP packet (e.g., render or output the original IP packet to the user).

Typically, the head fragment contains the packet's L3 and L4 headers, while the trailing fragments contain only the L3 header. Therefore, upon arrival at the PGW, the PCC rules can classify the head fragment based on the L3 and L4 information and apply the appropriate services; however, the PCC rules that classify fragments based on L4 information are unable to classify the trailing fragments because those fragments are missing the L4 headers. The trailing fragments are therefore classified differently than the head fragment of the IP packet, and thus, the set of services that are applied to the head fragment is different from the services that are applied to the trailing fragments. Effectively, this means that the services applied to the complete, original IP packet, as they are derived from the services applied to the individual constituent fragments, are incorrect.

For example, consider a large fragmented video packet that should be marked for low latency based on a User Datagram Protocol (UDP) port number. Conventional PGWs would treat the head fragment of the large packet for low latency based on the L3/L4 information carried in the header of the head fragment. However, the PGWs would treat the subsequent trailing fragments as best-effort packets, instead of low latency packets, because the information needed to classify these packets would be missing. Thus, the trailing fragments would not match any of the PCC filters. Since a subscriber device must wait for all the trailing fragments to arrive before it can reassemble and render the complete, original IP packet, the original IP packet would effectively not be treated as a low latency packet.

A conventionally configured PGW generally handles such situations in one of two ways. Particularly, before classification, the PGW can either fully reassemble the original IP packet and apply the services, or it can virtually reassemble the fragments and apply the services. With full reassembly, the PGW queues each received fragment as it is received. After all the constituent fragments of the complete IP packet have been received, the PGW reassembles the fragments, classifies the packet, and then applies the appropriate services on the reassembled packet. Once the services are applied, the PGW re-fragments the IP packet before sending the fragments to the subscriber device. With virtual reassembly, the PGW also queues each of the constituent fragments upon receipt of the fragments but does not reassemble the fragments. Instead, after all fragments have been received, the PGW classifies the head fragment, and then subjects each of the queued fragments to the services defined by the PCC rule that matches the information contained in the head fragment. The PGW then forwards the treated fragments on to the subscriber device.

Both of these conventional approaches (i.e., full and virtual reassembly at the PGW) allow the PGW to apply the same services to all of the constituent fragments of an IP packet. However, these approaches are also problematic. Specifically, both conventional methods increase network latency because they consume large amounts of resources at the PGW. Additionally, the queued fragments are sent by the PGW non-sequentially relative to other un-fragmented IP packets that are being sent to the subscriber device. A more desirable behavior is for the PGW to send fragments to the subscriber device after applying correct services on all fragments without having to first queue the packets.

SUMMARY

The present invention configures a Packet Gateway (PGW) for processing the fragments of a segmented IP packet without requiring the PGW to first receive all the fragments. In one embodiment, a method of processing a plurality of fragments of an IP packet in a communications network comprises classifying packet fragments received at the PGW. The received packet fragments comprise a head fragment and one or more trailing fragments, and are associated with a first IP packet. The PGW applies a same selected service treatment to the head fragment and to each of the trailing fragments based on the classification of the head fragment before sending each packet fragment to an end user device after applying the service treatment.

In one embodiment, the method further comprises determining whether a received fragment is the head fragment or a trailing fragment. If the received fragment is a head fragment, the method requires filtering the head packet through a primary filter table at the PGW to determine the selected service treatment to apply to the head fragment. The method then updates a supplementary filter table at the PGW to associate the selected service treatment with each of the trailing fragments.

In one embodiment, determining whether a received fragment is the head fragment comprises determining whether the received fragment includes Layer 4 protocol information.

In one embodiment, the primary filter table comprises one or more entries, each of which is associated with a corresponding predetermined service treatment. In such embodiments, filtering the head packet through a primary filter table comprises comparing data from the head fragment to the one or more entries in the primary filter table. If the data from the head fragment matches an entry, the method selects the service treatment that corresponds to the entry to apply to the head fragment.

In one embodiment, updating a supplementary filter table comprises generating a supplemental entry to include information based on the classification of the head fragment, associating the supplemental entry with the selected service treatment applied to the head fragment, and updating the supplementary filter table to include the supplemental entry. Further, generating a supplemental entry comprises generating the supplemental entry to include a time of creation for the supplemental entry. Once the age of the supplemental entry exceeds a predetermined age threshold, the supplemental entry is deleted.

In one embodiment, if the received fragment is a trailing fragment, the method compares data from the received fragment to the supplemental entry in the supplemental filter table, and selects the service treatment associated with the supplemental entry to apply to the received fragment. Additionally, if the trailing fragment is the final fragment of the first IP packet, the supplemental entry and the associated selected service treatment are deleted from the supplemental filter table.

In one embodiment, if the trailing packets are received before the head packet, the method further comprises storing the trailing fragments in a buffer until the head fragment is received. Then, once the head fragment is received, the method classifies the head fragment and applies the appropriate service treatment to the head fragment and all the trailing fragments that are in the buffer.

In addition to the method, the present invention also provides a packet gateway (PGW) configured to process a plurality of fragments of an IP packet. In one embodiment, the PGW comprises a first communications interface configured to receive a plurality of IP packet fragments from a network. The received packet fragments comprise a head fragment and one or more trailing fragments, and are associated with a first IP packet. The PGW also comprises a second communications interface configured to send the plurality of IP packet fragments to a user device via an access network, and a controller. In one or more embodiments of the present invention, the controller is configured to classify packet fragments received via the first communications interface, apply a same selected service treatment to the head fragment and to each of the trailing fragments based on the classification of the head fragment, and send each packet fragment to the end user device via the second communications interface after applying the service treatment.

In one embodiment, the PGW further comprises a memory configured to store a primary filter table associating head fragments with corresponding predetermined service treatments, and a supplementary filter table associating trailing packet fragments with the predetermined service treatments.

In addition, the controller may be further configured to determine whether a received fragment is a head fragment or a trailing fragment. If the received fragment is a head fragment, filtering the head fragment through the primary filter table to select the service treatment to apply to the head fragment, and update the supplementary filter table to associate the selected service treatment with each of the trailing fragments.

In one embodiment, the controller is configured to determine that a received fragment is a head fragment if the received fragment includes Layer 4 protocol information.

In one or more embodiments, the primary filter table comprises one or more entries, each associated with a corresponding predetermined service treatment. In such embodiments, filtering the head packet through the primary filter table comprises comparing data from the head fragment to the one or more entries in the primary filter table. If the data from the head fragment matches an entry, the controller selects the service treatment that corresponds to the entry to apply to the head fragment.

In one embodiment, the controller is also configured to generate a supplemental entry to include information based on the classification of the head fragment, associate the supplemental entry with the selected service treatment applied to the head fragment, and update the supplementary filter table to include the supplemental entry.

In one embodiment, the controller is further configured to generate the supplemental entry to include a time of creation for the supplemental entry. After an age of the supplemental entry exceeds a predetermined age threshold, the controller deletes the supplemental entry from the supplemental filter table.

In one embodiment, if the received fragment is a trailing fragment, the controller is configured to compare data from the received fragment to the supplemental entry in the supplemental filter table, and select the service treatment associated with the supplemental entry to apply to the received fragment. The controller is further configured to delete the supplemental entry and the associated selected service treatment from the supplemental filter table if the trailing fragment is the final fragment of the first IP packet.

In one embodiment, the controller is further configured to determine whether the trailing fragments are received at the PGW before the head fragment. If a trailing fragment is received before the head fragment, the controller is configured to store the received trailing fragment in a buffer, and apply the service treatment to the head fragment and to all the trailing fragments in the buffer once the head fragment has been received and classified.

Of course, those skilled in the art will appreciate that the present invention is not limited to the above contexts or examples, and will recognize additional features and advantages upon reading the following detailed description and upon viewing the accompanying drawings.

DETAILED DESCRIPTION

Generally, the head and trailing fragments of fragmented IP packets will arrive at the PGW in sequence. That is, the head fragment will usually arrive at the PGW before the trailing fragments. Therefore, using the system and method of the present invention, it is possible to classify the fragmented IP packets at a Packet Gateway (PGW), apply the appropriate Service Data Flow (SDF) to each of the packets, and forward the fragments to a destination subscriber device without having to fully reassemble, or virtually reassemble, the fragments at the PGW.

More particularly, as the PGW receives the constituent fragments of a given IP packet, a Policy Control Enforcement Function (PCEF) executing on the PGW classifies the head fragment to determine the appropriate Service Data Flow (SDF), and stores the information associated with the determined SDF and head fragment in memory. The head fragment is then forwarded to a destination subscriber device without having to wait at the PGW for the constituent trailing fragments. Thereafter, as the PGW receives each constituent trailing fragment, the PCEF uses the stored information to determine and apply the same SDF to the trailing fragment before sending the fragment to the subscriber device. As with the head fragment, each trailing fragment is appropriately treated and sent to the subscriber device without having to wait for the remaining trailing fragments.

The present invention provides benefits that conventional methods of classifying and treating fragmented IP packets are not able to provide. Particularly, the present invention is simple to implement and maintain on existing PGWs. Further, it ensures that the correct policy enforcement is applied for all the constituent fragments of a fragmented IP packet. As such, all the fragments of an IP packet marked for low latency, for example, will effectively be treated as low latency fragments. Additionally, the present invention helps to enhance the performance of the processing entities that are external to the PGW. Particularly, TCP/IP applications executing on these external entities generally perform more efficiently when they process full IP packets in their sequential order. Because the present invention maintains the sequence of the corresponding IP packet fragments, the external network entities that receive the treated fragments from the PGW are able to process the fragments, and thus, their corresponding IP packets, more efficiently. Moreover, maintaining the fragment sequence causes a line card (or other component processing the fragments) at the PGW to use fewer resources (e.g., CPU and/or packet buffer memory) than the components that process fragmented IP packets according to conventional full or virtual reassembly methods. Additionally, a PGW configured in accordance with the present invention can apply the correct services to all fragments without changing inter-packet jitter. This differentiates a PGW configured according to the present invention from a conventionally-configured PGW that implements virtual reassembly or full reassembly of the packets.

Figure 1:
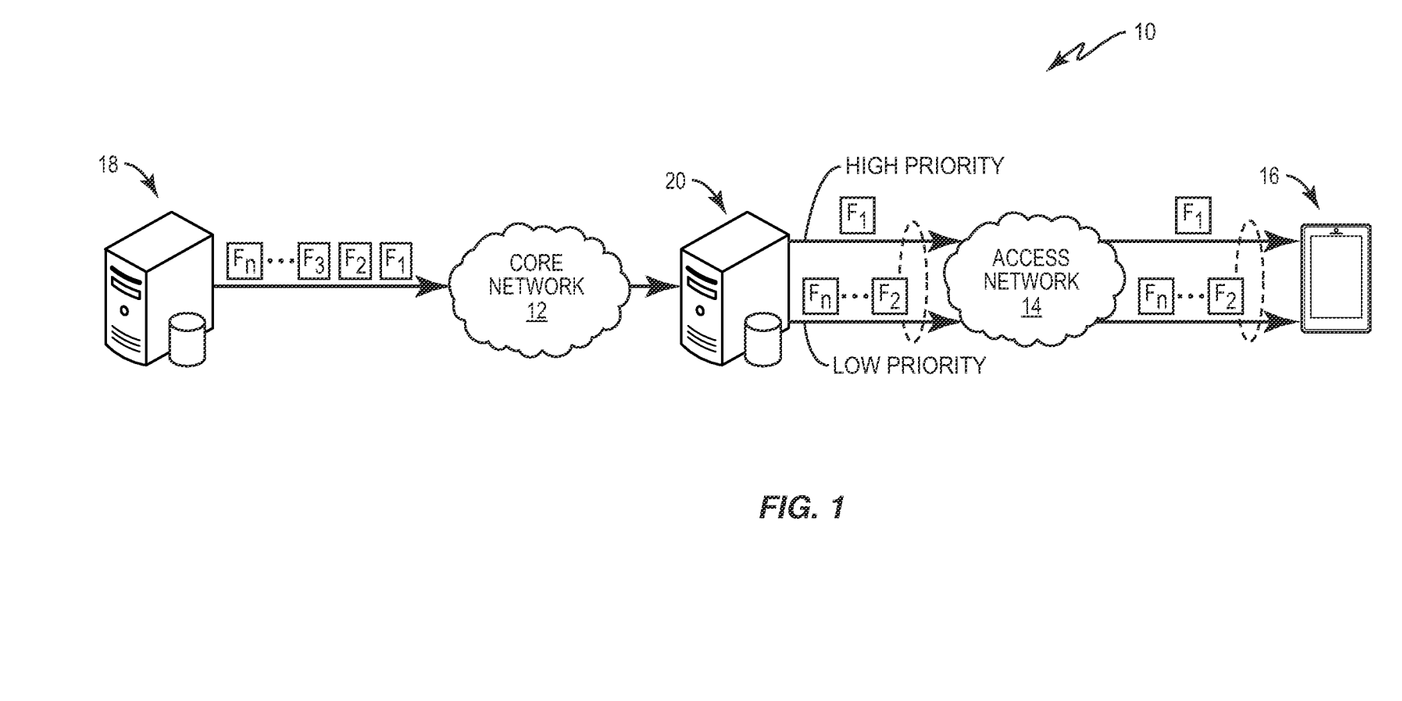
FIG. 1 is a functional block diagram illustrating a communications system configured to deliver a plurality of packet fragments to an end user device.

Turning now to the drawings, FIG. 1 illustrates a communications system 10 that processes the fragments of an IP packet according to conventional wisdom. Particularly, system 10 comprises a core network 12, an access network 14, a subscriber device 16, a network server 18, and a PGW 20. The operation and functions of the core and access networks 12, 14 are well-known in the art, and thus, are not described in detail here. It is sufficient to understand, however, that the core network 12 communicatively connects the network server 18 and the PGW 20, and that the access network 14 anchors the subscriber device 16 to the PGW 20 and network server 18.

The subscriber device 16, although seen in FIG. 1 as a mobile communications device, can be any end device capable of communicating with the network server 18 to send and receive IP packets. Typically, the subscriber device 16 will request data from the network server 18, which may be an application server, for example, and receive that information in the form of IP packets via the PGW 20 and the networks 12, 14. Once received, the subscriber device 16 will output or render the data to the user. As previously stated, very large IP packets, such as those that carry video, are first fragmented into a plurality of constituent fragments $F_1, F_2, F_3, \ldots F_n$. Methods by which to fragment such large IP packets are well-known, and may be performed by the network server 16 or by a processing entity within the realm of the core network 12. Regardless of where fragmentation occurs, however, the fragments $F_1, \ldots F_n$ of an IP packet are sent in-sequence to the PGW 20 via the core network 12 for processing and transmission through the networks 12, 14 to the subscriber device 16. As seen in FIG. 1, the fragments $F_1, \ldots F_n$ are being delivered to the subscriber device over different flows; however, the physical link may be the same for each flow.

In FIG. 1, the IP packet is indicated as being a low latency packet that should therefore be processed and sent to the subscriber device 18 as a high priority packet. However, conventional methods of processing the fragments can effectively cause the subscriber device 18 receiving the fragments to treat the IP packet as an ordinary packet.

Figure 2:
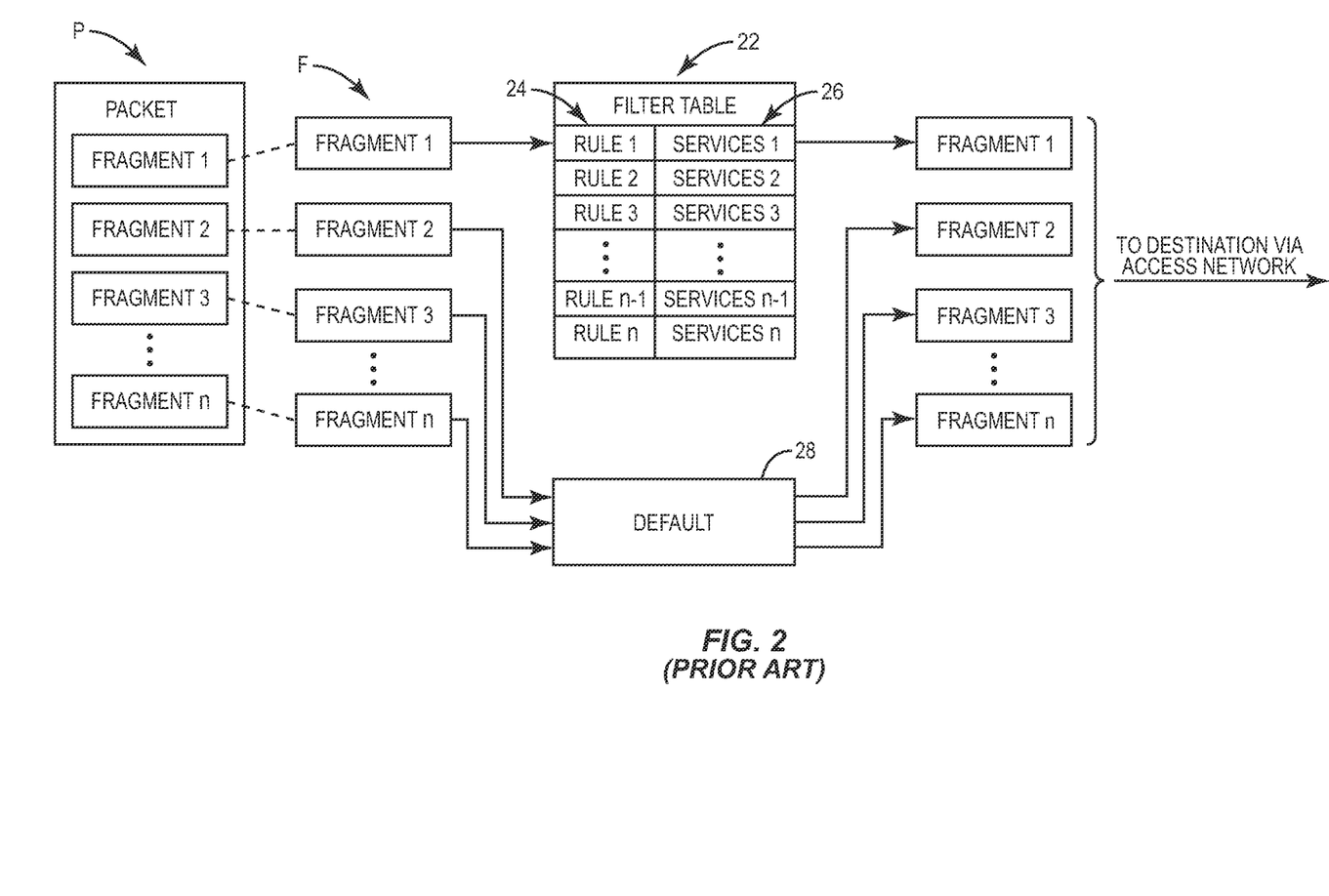
FIG. 2 is a functional block diagram illustrating a Packet Gateway (PGW) conventionally processing multiple packet fragments for delivery to an end user device.

Particularly, FIG. 2 is a functional block diagram illustrating how a conventionally configured PGW processes the multiple packet fragments $F_1, \ldots F_n$ for delivery to the subscriber device 16. As seen in FIG. 2, the PGW includes a filter table 22 that maps different rules 24 to associated service treatments 26. The PGW also includes a default table 28. Upon receiving the fragments $F_1, \ldots F_n$ (collectively F) that constitute the original IP packet P, in-sequence, the PCEF at the PGW uses the filter table 22 to classify and treat the head fragment $F_1$ based on the L3/L4 information carried in the header of that fragment. Specifically, the PCEF determines the appropriate rule for the head fragment $F_1$, and then applies the corresponding service treatment to that fragment.

As stated above, the L3/L4 header information in the head fragment indicates that fragment $F_1$ is part of a high priority IP packet. Therefore, the conventional PGW classifies and treats that fragment as a high priority fragment, and sends the fragment to the subscriber device 16 via the access network 14. However, since the trailing fragments $F_2 \ldots F_n$ do not carry the L4 header information, the PCEF cannot utilize the filter table 22 to classify and treat the trailing fragments $F_2 \ldots F_n$ in the same manner that it classified and treated the head fragment $F_1$. In these cases, the PCEF will process each of the trailing fragments $F_2 \ldots F_n$ as if they were part of an ordinary packet and use the default table 28 to determine a service treatment. As a result, the trailing fragments $F_2 \ldots F_n$ are not treated as if they were part of a high priority packet. Rather, they are treated as if they were part of a low priority packet and forwarded to the subscriber device 16 via the access network 14 as low priority packets over the communications link.

As previously stated, the subscriber device 16 must wait to receive all of the constituent fragments F before it renders the complete IP packet P. However, if some of the trailing fragments $F_2 \ldots F_n$ are not sent to the subscriber device 18 with the same high priority as the corresponding head fragment $F_1$, there can be a delay in rendering the IP packet P thereby causing the subscriber device 16 to effectively treat the IP packet P as a low priority packet. Additionally, fragments sent as low priority have a greater risk of being dropped due to congestion. Conventional methods performed at the PGW (e.g., full and virtual reassembly) can help to mitigate such a delay at the subscriber device 16, but undesirably increase resource utilization at the PGW and can also increase network latency.

Figure 3:
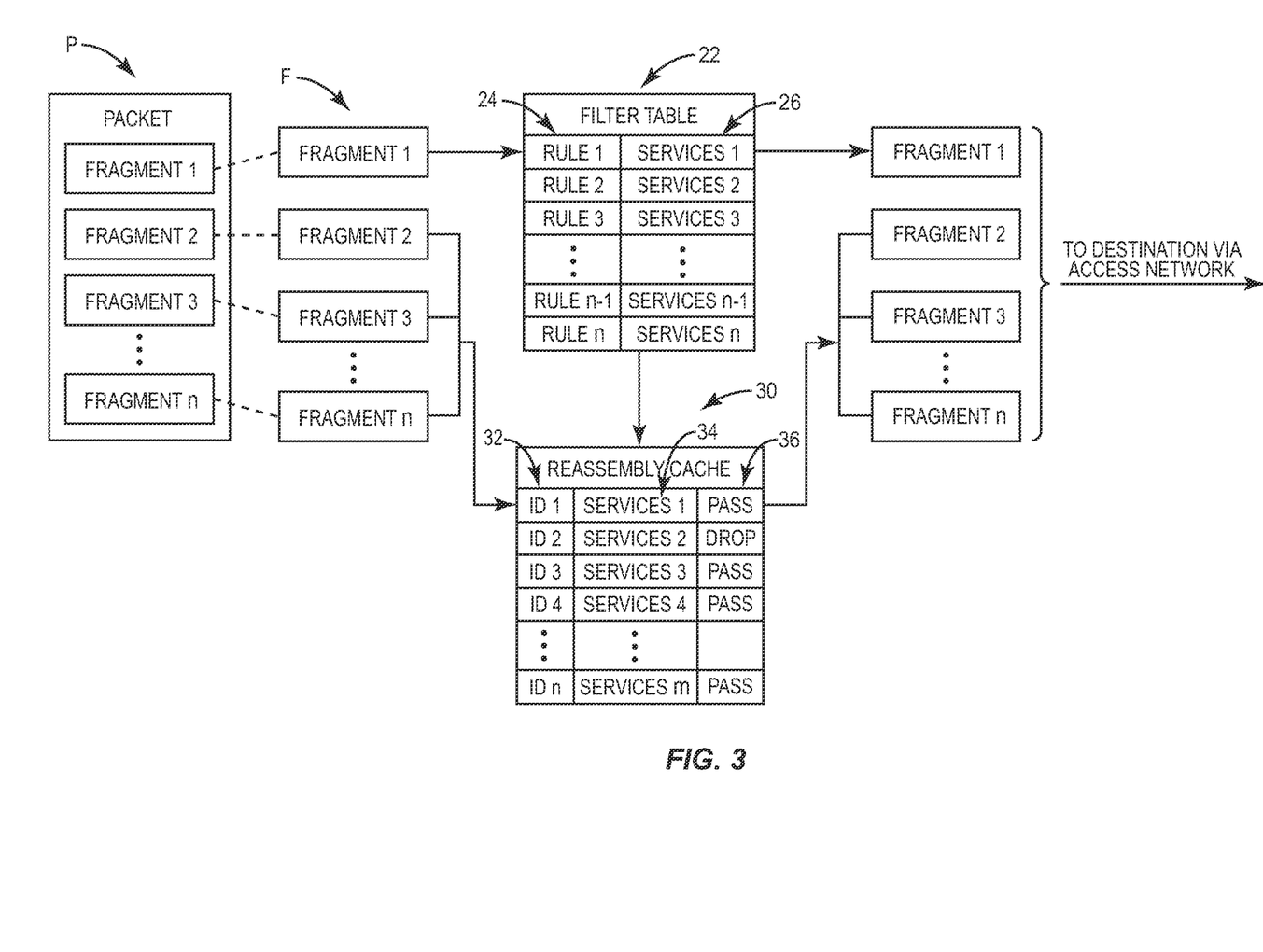
FIG. 3 is a functional block diagram illustrating an exemplary PGW configured according to one embodiment of the present invention processing multiple packet fragments for delivery to an end user device.

The present invention, however, configures the PGW to process the constituent fragments F of the IP packet P such that the delay at the subscriber device 16 is eliminated without imposing a significant increased demand on resources, and without adding to network latency. Particularly, FIG. 3 is a functional block diagram illustrating how PGW 20 configured according to one embodiment of the present invention processes multiple packet fragments for delivery to an end user device. As seen in FIG. 3, PGW 20 is configured to include the filter table 22. As previously described, the PGW 20 uses the filter table 22 to classify the head fragment $F_1$ and identify a corresponding service treatment to be applied to the head fragment $F_1$, based on the L3/L4 header information in that fragment. However, in addition to the filter table 22, the PGW 20 is also configured to include a supplementary data structure, which in FIG. 3 is labeled as a Reassembly Cache (RC) 30. The RC 30 functions to map fragment identity values 32 to corresponding service treatments 34. The RC 30 also includes a DROP/PASS indicator 36 to indicate whether any of the fragments F of the IP packet P were dropped.

According to one embodiment of the present invention, the PGW adds an entry to the RC 30 for each received head fragment $F_1$. The entry in RC 30 may be keyed, for example, by the source and destination IP address and the IP identifier carried by the head fragment $F_1$. The entry also includes the classification result of head fragment $F_1$, as well as a date and/or time that the entry was created. The timestamp of creation may be used in some embodiments to age out the entry. Thus, an entry added for any given head fragment may remain in the RC 30 only for a pre-determined time period. After that period expires, the entry is removed or deleted from RC 30. This helps to maintain the size of RC 30 at an optimal size, as entries are created and maintained dynamically in real-time.

In operation, PGW 20, upon receiving each subsequent trailing packet $F_2 \ldots F_n$, in sequence, locates the appropriate entry for the corresponding head fragment $F_1$ in the RC 30. For example, the PGW 20 may compare the source and destination IP address and the IP identifier carried by the L3 header of each trailing packet $F_2 \ldots F_n$ to the ID value 32 in RC 30. If a match is found, the PGW 20 determines and applies the corresponding service treatment 34 to the trailing fragment before sending the trailing fragment to the subscriber device 18. Upon receiving and treating the final trailing fragment $F_n$ comprising the IP packet P, the PGW 20 simply deletes the corresponding entry from the RC 30.

Figure 4A:
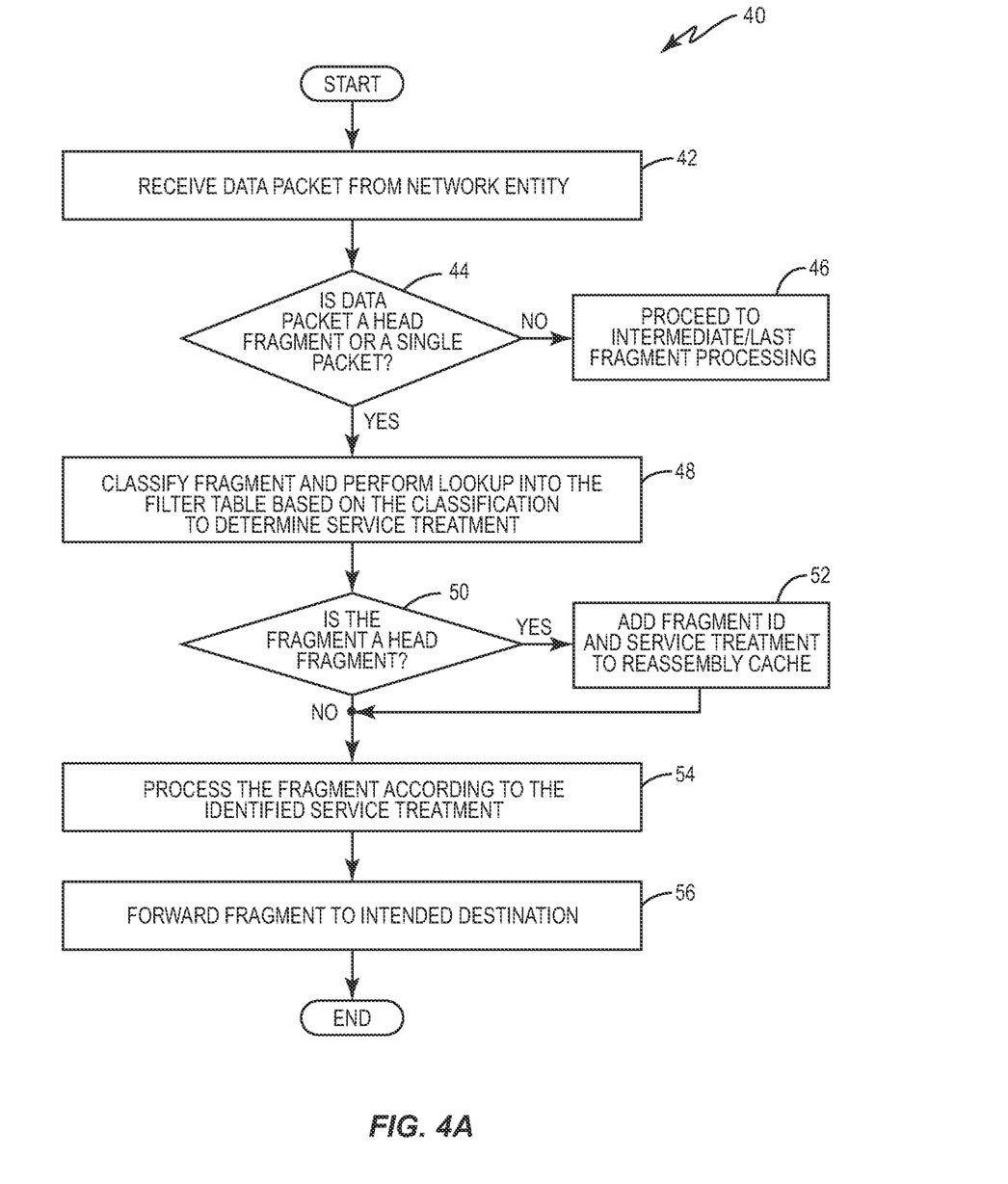
FIGS. 4A-4C are flow diagrams illustrating an exemplary method for processing multiple packet fragments at a PGW according to one embodiment of the present invention.
Figure 4B:
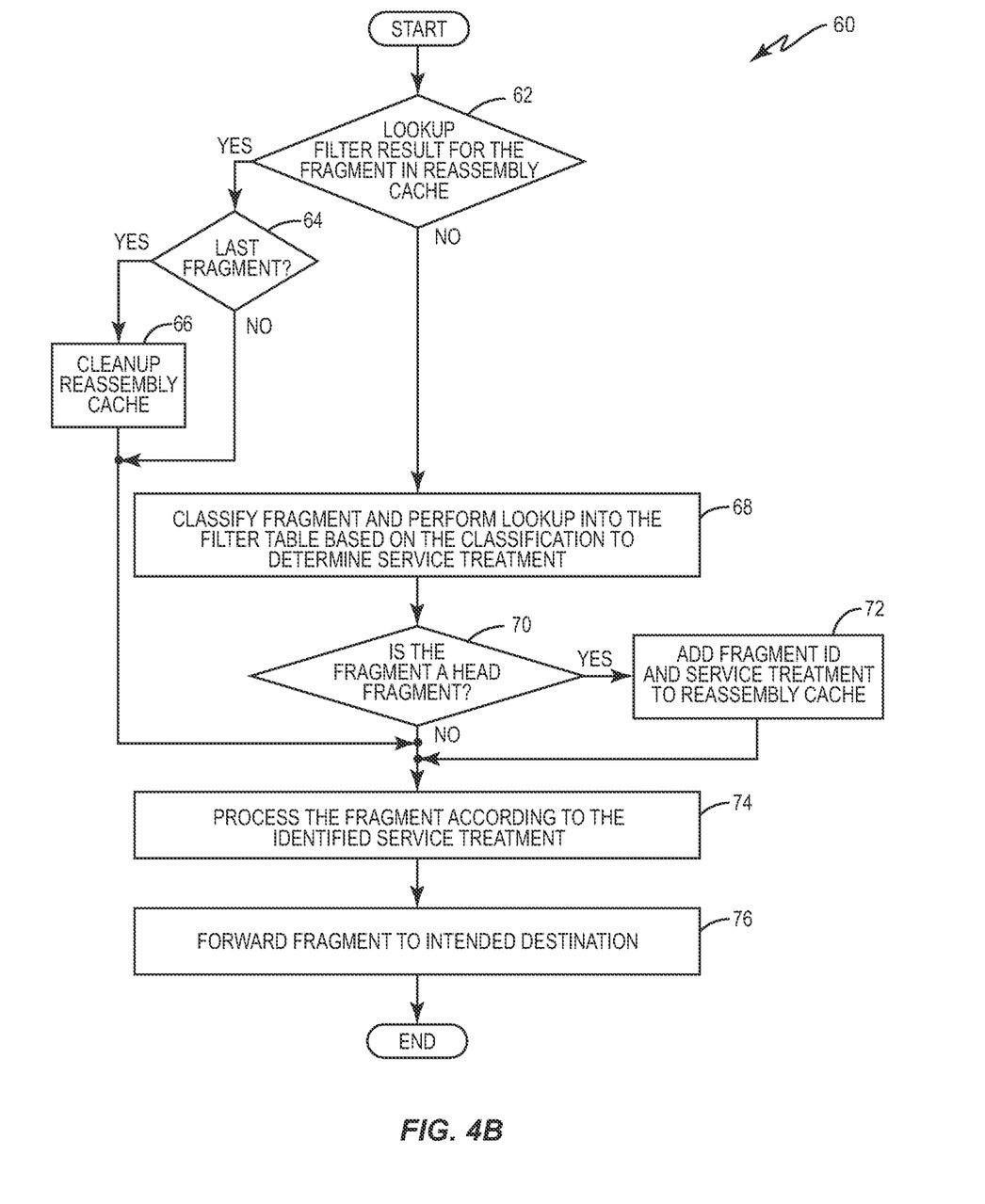
Figure 4C:
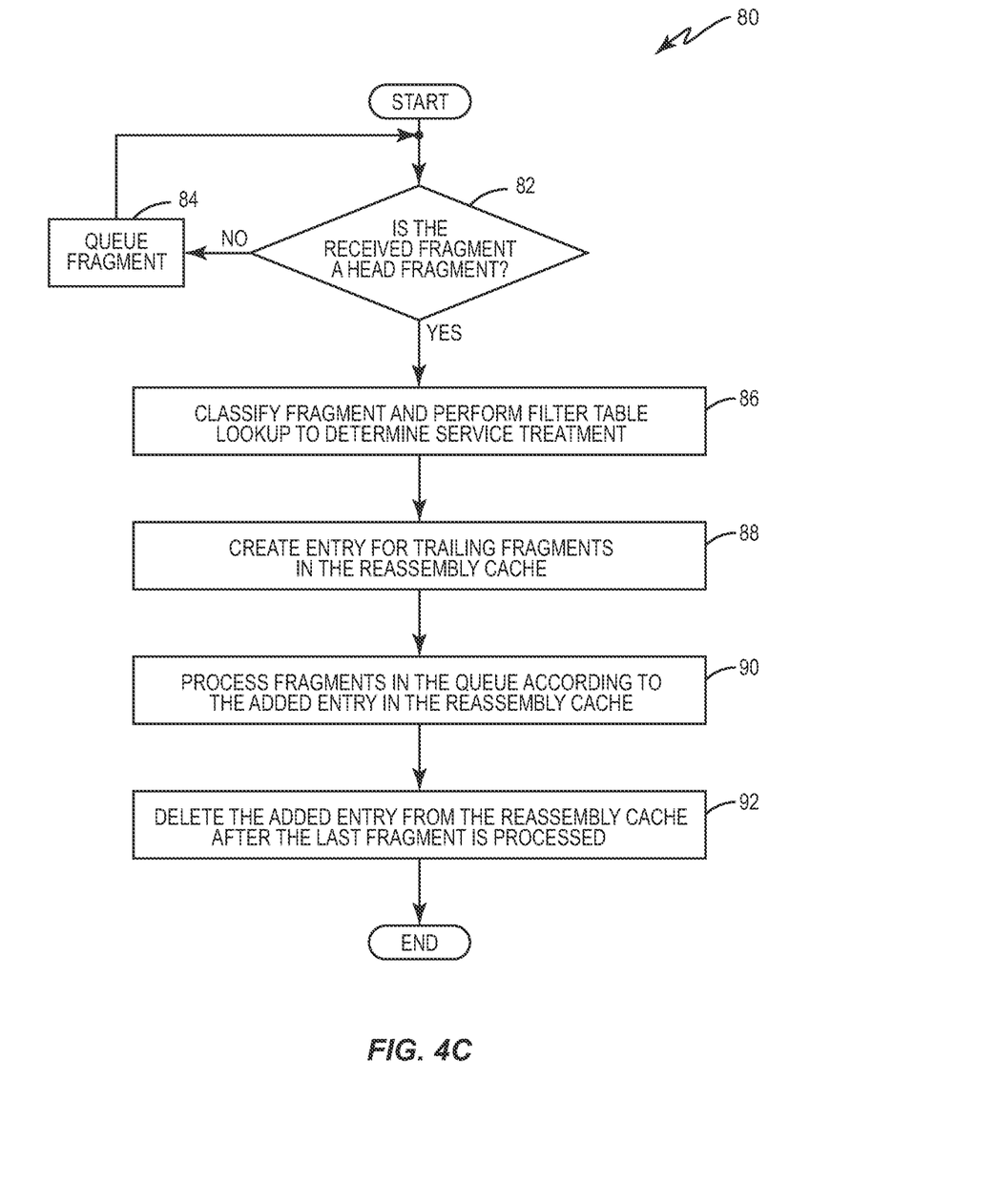

FIGS. 4A-4C are flow diagrams illustrating exemplary methods for processing multiple packet fragments at a PGW according to one embodiment of the present invention. Particularly, as seen in these figures, a PGW 20 configured with the RC 30 may determine and apply, to a head fragment and each of the trailing fragments, the same service treatment that without having to temporarily queue all the fragments F at the PGW 20.

As seen in method 40 of FIG. 4A, the PCEF at PGW 20 first receives a data packet from a router or other network entity associated with, or connected to, the core network 12 (box 42). In one embodiment, the PCEF analyzes the L3/L4 headers in the received data packet to determine whether the received data packet is a head fragment of a larger IP packet (e.g., a video packet), or whether it is a single, unfragmented IP packet (box 44). If the received data packet is neither a head fragment nor a single, unfragmented IP packet, then the received data packet must be a trailing packet. In these cases, the PCEF will process the trailing packet as an intermediate or final fragment in the original IP packet (box 46), which is explained in more detail below.

If, however, the received data packet is either a head fragment, or a single unfragmented IP packet, the PCEF classifies the data packet and performs a lookup into the filter table 22 (box 48). Any keys needed or desired may be used to index the filter table 22; however, in this embodiment, the filter table 22 is keyed on the source and destination IP address and the IP identifier. As stated previously, this information is also carried by the L3/L4 headers of the incoming data packet if the packet is a head fragment or a single unfragmented packet. Therefore, the PCEF can extract this data from the incoming data packet and use the extracted data as an index into the filter table 22 to classify the data packet and to determine service treatment for the data packet.

Once the data packet has been classified and a service treatment determined, the PCEF updates the RC 30, but only if the incoming data packet is a head fragment (box 50). Particularly, the PCEF creates an entry in the RC 30 for processing of the subsequently received corresponding trailing fragments (box 52). The entry may be generated to include, as a key, the source and destination IP addresses and the IP identifier carried by the header of the head fragment, as well as the classification result for the head fragment. The newly created entry is also provided with a time of creation for the entry. The time of creation is a time stamp that indicates when the entry was created (i.e., when the head fragment was classified and treated at the PGW), and allows the present invention to optimize the size of the RC 30. Specifically, the PCEF periodically checks the RC 30. Entries in the RC 30 that remain after a predetermined time period are considered "stale" and may be removed.

Once the RC 30 has been updated, the PCEF processes the head fragment in accordance with the identified service treatment (box 54), and forwards the fragment to the intended destination (e.g., subscriber device 16 via access network 14) (box 56).

FIG. 4B illustrates a method 60 in which the PCEF at the PGW 20 processes the trailing fragments associated with the IP packet according to one embodiment of the present invention. Upon receiving a trailing fragment, the PCEF first looks to the RC 30 to determine the filter result for the head fragment that corresponds to the trailing fragment (box 62). If an entry in the RC 30 is found, the PCEF will determine whether the trailing fragment is a middle fragment (i.e., $F_2 \ldots F_{n-1}$), or whether the trailing fragment is the final fragment in the IP packet (i.e., $F_n$) (box 64). For example, in some embodiments, the PCEF has access to information that identifies the size of the original IP packet, and therefore, uses this information to calculate the number of constituent fragments that are associated with the IP packet. In other embodiments, the PCEF is simply be supplied with this information. Regardless of how the PCEF determines the number of fragments that constitute the IP packet, however, the PCEF differentiates between a middle fragment and a final fragment, and processes the fragment accordingly.

More particularly, if the trailing fragment is not the final fragment for the IP packet, the PCEF processes the trailing fragment according to the identified service treatment in the RC 30 (box 74) and forwards the trailing fragment to the intended destination subscriber device (box 76). If, however, the trailing fragment is the final fragment for the IP packet (box 64), then the PCEF deletes the corresponding entry from the RC 30 (box 66), processes the final fragment in accordance with the determined service treatment (box 74), and forwards the final fragment towards the intended destination (box 76), as previously described.

If, for a received fragment, there is no corresponding entry in the RC 30 (box 62), the PGW2 20 will classify the fragment and perform a lookup into the filter table 22 to determine a service treatment for the fragment based on that classification (box 68). If the received fragment is a head fragment (box 70), the PGW 20 creates a corresponding entry in the RC 30 by adding the fragment ID and the determined service treatment to the RC 30 (box 72), and then processes (box 74) and forwards (box 76) the fragment, as previously described.

As previously stated, the present invention configures the PCEF at the PGW 20 to process the fragments of an IP packet without having to first queue those fragments in memory at the PGW 20. However, there are situations in which the PGW 20 may have to temporarily store one or more fragments in a buffer. For example, in some situations, a router associated with the core network 12 may send an "out-of-sequence" fragment to the PGW. As such, it is possible that the head fragment $F_1$ may not be the first fragment to be processed by the PGW. In such scenarios, a conventionally configured PGW would simply fallback to a virtual reassembly procedure 100. However, in at least one embodiment, the present invention configures the PGW 20 to handle out-of-sequence fragments without resorting to a virtual assembly procedure.

FIG. 4C illustrates one such method 80 in which the PCEF, upon receiving a fragment determined to be out-of-sequence, first determines whether the received fragment is a head fragment or a trailing fragment (box 82). If the fragment is a trailing fragment, the PCEF simply places the fragment in a queue (box 84). If the fragment is the head fragment, however, the PCEF classifies the fragment and performs the filter table lookup to determine the appropriate service treatment (box 86). Once determined, the PCEF creates the RC 30 table entry for processing the trailing fragments (box 88) and processes the trailing fragments in the queue (box 90). The PCEF then processes subsequently received trailing fragments, as previously described, and deletes the corresponding entry from RC 30 upon receiving the final fragment (i.e., $F_n$) (box 92).

Figure 5:
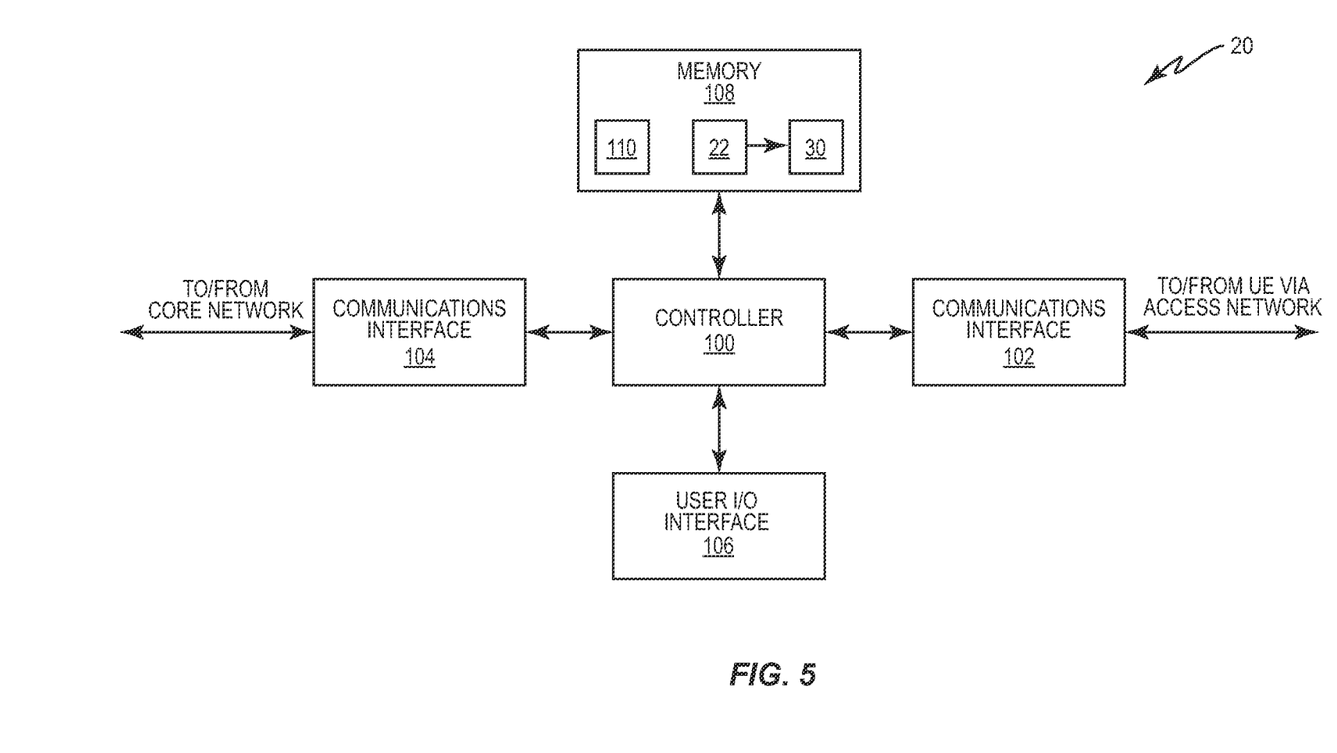
FIG. 5 is a functional block diagram illustrating some components of an exemplary PGW configured to process packet fragments for delivery to an end user device according to one embodiment of the present invention.

FIG. 5 is a functional block diagram illustrating some components of an exemplary PGW configured to process packet fragments for delivery to the subscriber device 18 according to one embodiment of the present invention. As seen in FIG. 5, the PGW 20 comprises a programmable controller 100, one or more communications interfaces 102, 104, a user input/output interface 106, and a memory 108. The memory 108 may comprise a solid state memory (e.g., ROM, DRAM, Flash, or a device capable of reading computer-readable media, such as optical or magnetic media).

The programmable controller 100 may also comprise any of a variety of one or more programmable microprocessors that are configured to control the operation of PGW 20 according to instructions and data stored in memory 108. Such instructions include, but are not limited to, the code necessary for performing communications functions, such as transmitting and receiving data packets and/or fragments to/from the core network 12 and the access network 14 via communications interfaces 104 and 102, respectively. The code and instructions also include a PCEF function 110, a filter table 22, and an RC 30 that is dynamically updated by the PCEF, as previously described.

The present invention may, of course, be carried out in other ways than those specifically set forth herein without departing from essential characteristics of the invention. For example, the previous embodiments identify the L3/L4 information in the header of the head fragment as being the information that a PCEF inserts into the RC 30. However, those skilled in the art will appreciate that the present invention is not so limited. For example, in situations where the transport mechanism utilizes IPV6, the head fragment may also contain a value that identifies a total length of the original IP packet. Therefore, when applying services such as rate limit, charging and volume limiting on the head fragment, the PGW can account for the original IP packet and store the result in the RC 30. Thus, if a reassembled packet would have been dropped due to a rate limit or volume-limit, all the constituent fragments of the original IP packet would receive similar treatment. Therefore, the present embodiments are to be considered in all respects as illustrative and not restrictive, and all changes coming within the meaning and equivalency range of the appended claims are intended to be embraced therein.

What is claimed is:

1. A method of processing a plurality of fragments of an IP packet in a communications network, the method comprising:
   receiving packet fragments at a packet gateway (PGW) associated with a first IP packet, wherein the received packet fragments are classified as a head fragment and one or more trailing fragments;
   if the received fragment is classified as a head fragment, filtering the head packet through a primary filter table at the PGW to determine the selected service treatment to apply to the head fragment;
   updating a supplementary filter table at the PGW to associate the selected service treatment with each of the trailing fragments;
   while receiving the packet fragments at the PGW, storing trailing fragments that are received at the PGW before the head fragment in a buffer;
   responsive to classifying a packet fragment as a head fragment:
   applying a same selected service treatment to the head fragment and to each of the trailing fragments stored in the buffer;
   applying the selected service treatment to the subsequently received trailing fragments based on the classification of the head fragment and without storing the subsequently received trailing fragment in the buffer; and
   sending the head fragment, the trailing fragments stored in the buffer, and each of the subsequently received trailing fragments to an end user device upon applying the selected service treatment.

2. The method of claim 1 wherein determining whether a received packet fragment is the head fragment comprises determining whether the received packet fragment includes Layer 4 protocol information.

3. The method of claim 1 wherein the primary filter table comprises one or more entries, each entry being associated with a corresponding predetermined service treatment, and wherein filtering the head packet through a primary filter table comprises:

comparing data from the head fragment to the one or more entries in the primary filter table;

if the data from the head fragment matches an entry, selecting the service treatment that corresponds to the entry to apply to the head fragment.

4. The method of claim 1 wherein updating a supplementary filter table comprises:

generating a supplemental entry to include information based on the classification of the head fragment;

associating the supplemental entry with the selected service treatment applied to the head fragment; and updating the supplementary filter table to include the supplemental entry.

5. The method of claim 4 wherein generating a supplemental entry further comprises generating the supplemental entry to include a time of creation for the supplemental entry.

6. The method of claim 4 wherein if the received packet fragment is classified as a trailing fragment, the method further comprises:

comparing data from the received packet fragment to the supplemental entry in the supplemental filter table;

selecting the service treatment associated with the supplemental entry to apply to the received packet fragment.

7. The method of claim 5 further comprising deleting the supplemental entry from the supplemental filter table after an age of the supplemental entry exceeds a predetermined age threshold.

8. The method of claim 6 wherein if the trailing fragment is the final fragment of the first IP packet, deleting the supplemental entry and the associated selected service treatment from the supplemental filter table.

9. A packet gateway (PGW) configured to process a plurality of fragments of an IP packet, the PGW comprising:

a first communications interface configured to receive a plurality of IP packet fragments from a network, wherein the received packet fragments comprise a head fragment and one or more trailing fragments, and are associated with a first IP packet;

a second communications interface configured to send the plurality of IP packet fragments to a user device via an access network;

a memory configured to store a primary filter table associating head fragments with corresponding predetermined service treatments, and a supplementary filter table associating trailing packet fragments with the predetermined service treatments; and a processing circuit configured to:

classify packet fragments received via the first communications interface as being either the head fragment or a trailing fragment, wherein the if the received fragment is a head fragment, the processing circuit is further configured to:

filter the head fragment through the primary filter table to select the service treatment to apply to the head fragment; and update the supplementary filter table to associate the selected service treatment with each of the trailing fragments;

store trailing fragments received at the PGW and before the head fragment in a buffer;

responsive to classifying a packet fragment as a head fragment:

apply a same selected service treatment to the head fragment and to each of the trailing fragments stored in the buffer;

apply the selected service treatment to subsequently received trailing fragment based on the classification of the head fragment and without storing the subsequently received trailing fragment in the buffer; and send the head fragment, the trailing fragments stored in the buffer, and each of the subsequently received trailing fragments to the end user device via the second communications interface upon applying the selected service treatment.

10. The PGW of claim 9 wherein the processing circuit is further configured to determine that a received packet fragment is the head fragment if the received packet fragment includes Layer 4 protocol information.

11. The PGW of claim 9 wherein the primary filter table comprises one or more entries, each entry being associated with a corresponding predetermined service treatment, and wherein filtering the head packet through the primary filter table comprises:

comparing data from the head fragment to the one or more entries in the primary filter table;

if the data from the head fragment matches an entry, selecting the service treatment that corresponds to the entry to apply to the head fragment.

12. The PGW of claim 9 wherein the processing circuit is further configured to:

generate a supplemental entry to include information based on the classification of the head fragment;

associate the supplemental entry with the selected service treatment applied to the head fragment; and update the supplementary filter table to include the supplemental entry.

13. The PGW of claim 12 wherein the processing circuit is further configured to generate the supplemental entry to include a time of creation for the supplemental entry.

14. The PGW of claim 12 wherein if the received packet fragment is a trailing fragment, the processing circuit is further configured to:

compare data from the received packet fragment to the supplemental entry in the supplemental filter table;

select the service treatment associated with the supplemental entry to apply to the received packet fragment.

15. The PGW of claim 13 wherein the processing circuit is further configured to delete the supplemental entry from the supplemental filter table after an age of the supplemental entry exceeds a predetermined age threshold.

16. The PGW of claim 14 wherein the processing circuit is further configured to delete the supplemental entry and the associated selected service treatment from the supplemental filter table if the trailing fragment is the final fragment of the first IP packet.

* * * * *

UNITED STATES PATENT AND TRADEMARK OFFICE
CERTIFICATE OF CORRECTION

PATENT NO. : 9,282,038 B2  
APPLICATION NO. : 13/421436  
DATED : March 8, 2016  
INVENTOR(S) : Bansod et al.

Page 1 of 1

It is certified that error appears in the above-identified patent and that said Letters Patent is hereby corrected as shown below:

In the Specification

In Column 6, Line 25, delete "server 16" and insert -- server 18 --, therefor.

In Column 6, Line 36, delete "device 18" and insert -- device 16 --, therefor.

In Column 6, Line 38, delete "device 18" and insert -- device 16 --, therefor.

In Column 7, Line 7, delete "device 18" and insert -- device 16 --, therefor.

In Column 7, Line 61, delete "device 18." and insert -- device 16. --, therefor.

In Column 9, Line 17, delete "PGW2 20" and insert -- PGW 20 --, therefor.

In Column 9, Line 56, delete "device 18" and insert -- device 16 --, therefor.

Signed and Sealed this
Twenty-eighth Day of June, 2016

Michelle K. Lee
*Director of the United States Patent and Trademark Office*